J. M. CRAWFORD.
CUTTER HEAD.
APPLICATION FILED JULY 23, 1913.

1,118,744.

Patented Nov. 24, 1914.

WITNESSES
Edw. Thorpe.
B. Joffe

INVENTOR
John Mack Crawford
BY Mumrles
ATTORNEYS

UNITED STATES PATENT OFFICE.

JOHN MACK CRAWFORD, OF EL PASO, TEXAS.

CUTTER-HEAD.

1,118,744. Specification of Letters Patent. Patented Nov. 24, 1914.

Application filed July 23, 1913. Serial No. 780,645.

*To all whom it may concern:*

Be it known that I, JOHN MACK CRAWFORD, a citizen of the United States, and a resident of El Paso, in the county of El Paso and State of Texas, have invented a new and Improved Cutter-Head, of which the following is a full, clear, and exact description.

My invention relates to cutter heads for woodworking machinery, principally used in the manufacture of window sashes, doors, blinds, or any other pattern of stickings; and it has reference more particularly to a cutter head having interchangeable bit carriers or bit seats.

The object of the invention is to provide a simple, strong and inexpensive cutter head which can be easily and quickly changed from sashes to doors or any other pattern of sticking regardless of the stock thickness and without removing the head from the machine which carries the bits, and which device will not call for a horizontal adjustment on the machine when a change in pattern or thickness of stock is made.

The invention consists of the construction and combination of parts to be more fully described hereinafter and fully set forth in the claim.

Figure 1:
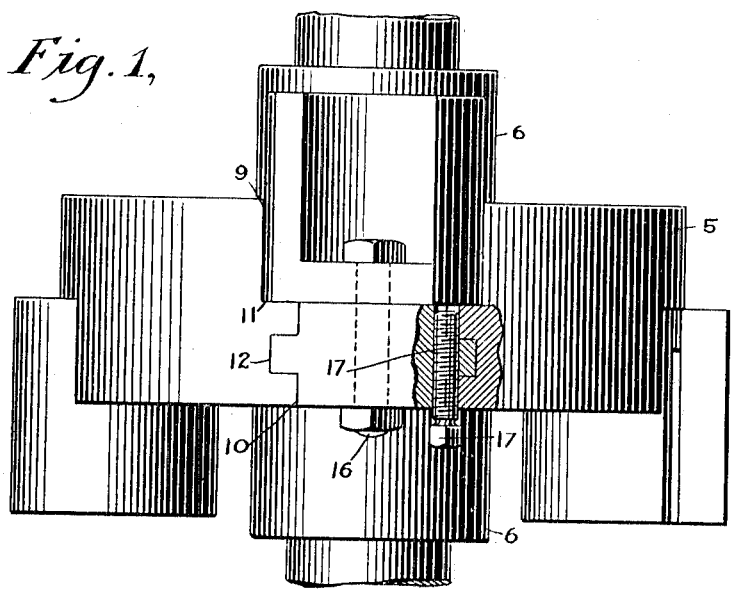
Figure 2:
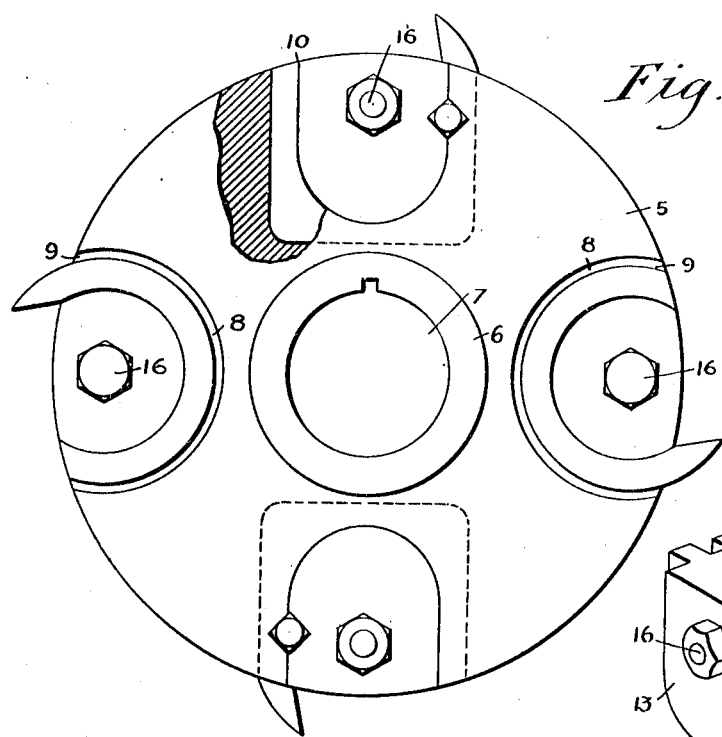
Figure 3:
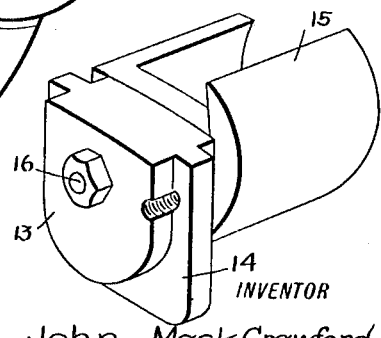

Reference is to be had to the accompanying drawings forming a part of this specification, in which like characters indicate corresponding parts in all the views and in which:

Figure 1 is an elevation of an embodiment of my invention partly broken away to show the details of construction; Fig. 2 is a plan view of the same, also partly broken away to show details of structure; and Fig. 3 is a perspective view of a bit and its carrier seat ready to be inserted into the head.

Referring to the drawings, the cutter head is formed of a flanged portion 5 provided on both of its faces with central portions 6 integral with the flange. A central bore 7 is provided in the head by means of which the same is fitted on the spindle of the machine.

The flange 5 is provided with diametrically opposite recesses 8 formed on its lateral surface; one-half 9 of each recess, in a direction parallel to the axis of the head, is circular in shape, having its center adjacent the lateral surface; while the other half 10 of the recess is rectangular adjacent the periphery of the flange and semi-circular adjacent the central portion of the same. This second part 10 of the recess being smaller than the first part 9, a shoulder 11 is formed between the two portions forming the recess. The consecutive recesses on the flange are staggered, so that the portion 9 of one recess is on the same face as the portion 10 of the adjacent recess. The portion 10 of the recess is provided with a groove 12 substantially parallel to the face of the flange.

Fitting into the portion 10 of the recess is a bit carrier or seat 13 having a lateral projection 14, preferably of rectangular shape, fitting snugly into the groove or keyway 12 of the recess portion 10. This projection 14 corresponds to the groove; and the reason for making the same rectangular is to give a better seat to the carrier within the head near the central portion of the same. Mounted on the bit carrier 13 is a cylindrically shaped bit 15 which is axially secured by means of a bolt 16 to the carrier previous to its being mounted in the head. The bit carrier is locked to the head, that is to the flange, by means of a set screw 17 threaded into the flange portion and the bit carrier.

By means of my device an exchange of bits is made very easily, as by removing the set screws 17 the bit carrier with the bit screwed thereto is simply pulled out laterally from the head and a new bit carrier and bit, adjusted in the tool room, is simply slid into position and again locked by means of the screw. The bit carrier 13 being adapted to receive any shape of bit, and being always in the same position in the head, will put the bit in the proper position with reference to the head and, therefore, no adjustment of the machine for the bit is necessary. The provision of the shoulder 11 in the recesses 8 forms a base for the bit mounted on the carrier and, therefore, relieves the strain from the carrier and puts the same on to the flange portion, which is part of the head. Attention is called to the fact that due to the lateral movement of the bit carriers the same are always in exact relation to the head; and no horizontal displacement of the head is necessary, due to that provision.

Having thus described my invention, I claim as new and desire to secure by Letters Patent:

In a cutter head, a flange having means adapted to engage a spindle, the flange having a shouldered recess open entirely on the periphery of the flange, said recess forming a large and a small portion in said flange, said small portion of the recess having a groove extending through the entire lateral surface thereof and substantially parallel to the face of the flange, a cutter-carrier adapted to engage the small portion of the recess from the periphery of the flange, said cutter-carrier having a shoulder portion fitting slidably into said groove, means for locking the cutter-carrier to said flange, and a bit adjustably mounted on said carrier and fitting into the large portion of the recess from the periphery of the flange.

In testimony whereof I have signed my name to this specification in the presence of two subscribing witnesses.

JOHN MACK CRAWFORD.

Witnesses:
O. B. WILSON,
A. F. WILSON.

Copies of this patent may be obtained for five cents each, by addressing the "Commissioner of Patents, Washington, D. C."